3,352,125
PRESSURE COMPENSATED POLYPHASE EXPANSION VALVE REFRIGERATION SYSTEM
Paul K. Beatenbough, Medina, and Marshall W. Baker, Lockport, N.Y., assignors to General Motors Corporation, Detroit, Mich., a corporation of Delaware
Filed Aug. 16, 1965, Ser. No. 479,865
5 Claims. (Cl. 62—211)

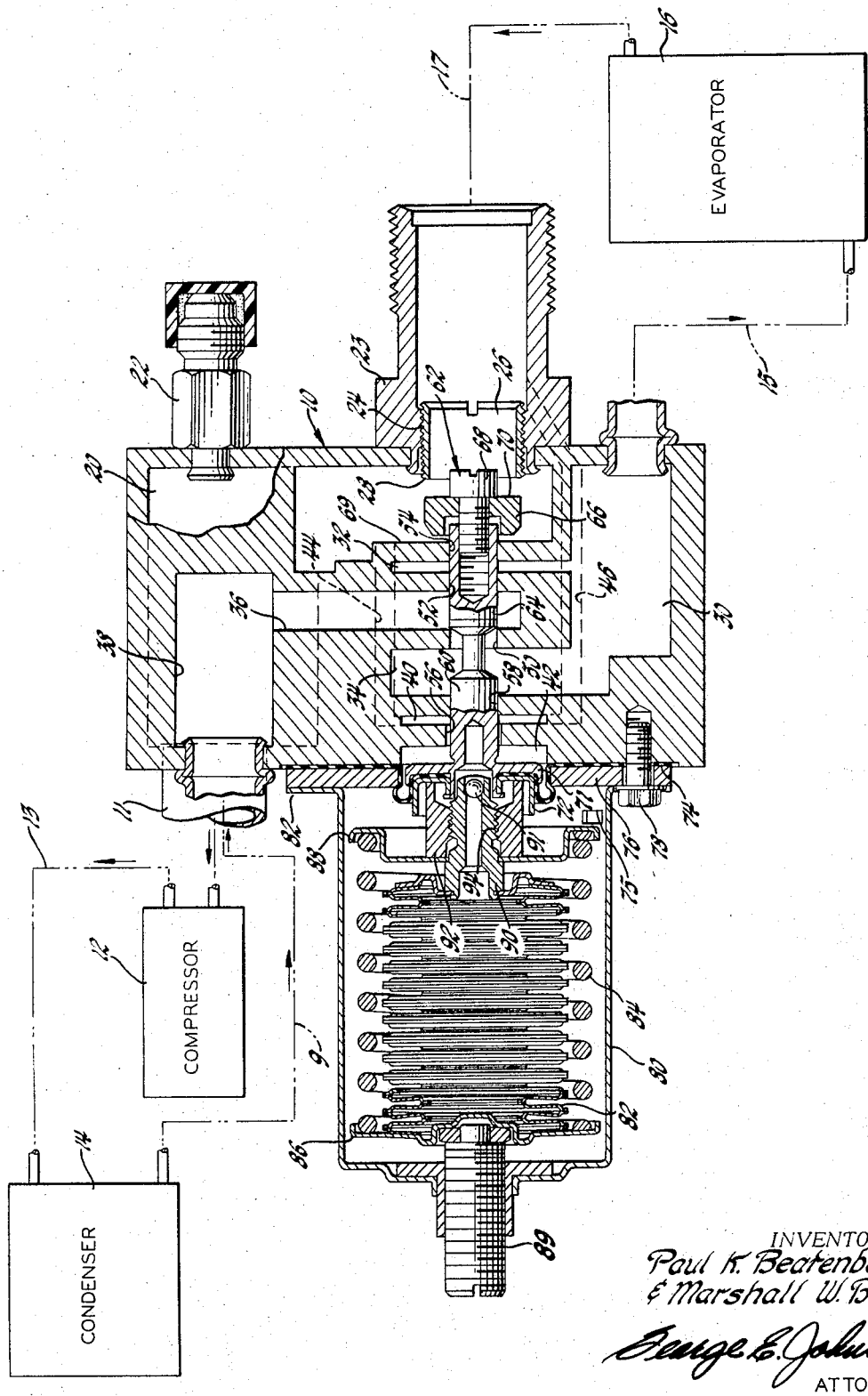

ABSTRACT OF THE DISCLOSURE

A refrigeration system having a control valve for refrigerant flow, the valve functioning to give constant evaporator outlet pressure by balancing atmospheric pressure plus a spring loading against evaporator discharge pressure plus compressor inlet pressure.

---

This invention relates to refrigeration systems and more particularly to refrigeration systems with control means therein regulating refrigerant pressures for effective operation of evaporators despite a divergence in ambient and elevation conditions encountered especially but not necessarily in automobile air conditioning wherein an added factor must be contended with and this factor is car speed variation.

Many refrigeration systems each embody three basic components which are a compressor, a condenser and an evaporator arranged in a closed circuit for the passage of refrigerant. In general, there are two main pressure levels—a high pressure side which extends from the compressor to a control valve and includes a condenser—and a low pressure side which extends from the control valve to the compressor and includes an evaporator. The compressor usually runs continuously and separates the two pressure levels at one point in the circuit and the control valve, although it constitutes the other main barrier, generally necessitates other or auxiliary control components for effective operation. Examples of such a system are disclosed in the United States Patent 2,000,965, granted May 14, 1935 in the name of Carl Lipman and also in the United States patent to Seligman et al. 2,475,556, granted July 5, 1949.

If, as occurs in automobile air conditioning, a given situation varies widely in ambient conditions, compressor capacity, evaporator load, etc., difficulty is encountered in maintaining the evaporator effective in performing its function at all times—the effective extraction of heat from air passing through the evaporator core despite the variables. If a given evaporator, in a refrigeration system as heretofore known, operates well at above 50° F. ambient temperature or at sea level, it may become too cold at below that temperature, at high vehicle speed with low load, or at a high elevation location with a resultant freeze-up of condensate on the evaporator core as the evaporator suction pressure is not controlled. In modern automobiles, it is often desirable to use the refrigeration aspect at low ambient temperature to reduce the moisture content of the air and then to heat the dry air before introducing the latter into the passenger compartment.

An object of the present invention is to provide a refrigeration system using the conventional main or basic components heretofore mentioned but provided with an improved and unitary control valve arrangement of high sensitivity therein and giving a dual action control whereby evaporator pressure and temperature conditions are controlled for effective system operation during widely varying temperature and pressure conditions.

A feature of the present invention is a refrigeration system having an improved dual action valve arrangement of high sensitivity, of simple and low cost construction, and which compensates for variations in ambient pressure controlling evaporator temperature and pressure despite a variation in ambient temperature in a wide range extending above and below 50 degrees Fahrenheit.

This and other important features of the invention will now be described in detail in the specification and then pointed out more particularly in the appended claims.

The sole figure in the drawing shows a refrigeration system having a control valve assembly drawn to a relatively large scale and sectioned to show its construction and as connected diagrammatically to conventional components to be used with the assembly including a compressor, a condenser and an evaporator.

A compressor 12 is connected to a condenser 14 by a line 13 and the condenser discharges to a valve assembly 10 by a line 9. A line 15 connects the valve assembly 10 to an evaporator 16 and a line 17 leads from the evaporator back to the valve assembly 10. A line 11 connects the latter to the compressor 12.

The control valve assembly 10 constitutes a block which conveniently may be laminated or made up of a number of pieces of sheet metal suitably apertured and fastened together in leak-proof fashion so that in the completed block essential chambers, ports and flow passages are defined.

One of these chambers constitutes a compressor return flow chamber and is indicated at 20. A capped connection 22 is provided whereby a gage may be temporarily attached to the block in the testing or setting up of the system. One end of the return flow chamber 20 communicates with the line 11 leading to the intake of the compressor 12 as above stated. The chamber 20 is also provided with a nipple 23 by means of which the line 17 leading from the evaporator is connected. Enclosed within the nipple 23 and adjustably held by means of threads 24 is a kerfed sleeve 26 and a continuous smooth annular surface 28 at one end of this sleeve constitutes a valve seat.

The second main chamber of the valve assembly 10 is a low pressure chamber 30 adapted to contain a mixture of vapor and liquid refrigerant and this chamber is connected to the evaporator 16 by a line 15 as above indicated. The chamber 30 has two vertically extending pockets 32 and 34. The pocket 32 is relatively small in width or capacity as compared with the pocket 34 as shown in the drawing. Interposed between these two pockets is a pocket 36 which is a downward extension of a horizontal chamber 38 and the latter is connected by means of a line 9 to the outlet of the condenser 14. Also formed in the assembly 10 is a small pocket 40 and a recess 42. The pocket 40 communicates with the compressor return flow chamber 20 by means a restrictive passage 44. It also communicates with the interior of the nippel 23 by means of a restrictive passage 46. The recess 42 as well as the pocket 40 are in alignment with the axis of the sleeve 26 and the nipple 23. An extension port 50 connects the pockets 36 and 34 and passages 42 and 54 are provided between the pocket 36 and the chamber 20 respectively and the pocket 32. There is no porting of refrigerant at 52 and 54. The block is also bored as at 56 and 58 to provide a sliding fit at 58 of a land 60 of a multi-valve or dual action control unit indicated generally at 62 and a clearance at 56 for free equalization of pressure.

The dual action valve unit 62 is a piston type valve having a shoulder of a second land 64 for cooperating with the port 50 in functioning as an expansion valve or for metering the flow of refrigerant fluid (vapor and/or liquid) to the chamber 30 and from there to the evaporator 16. A secondary valve 66 is located in the chamber 20 and is fixed to the land portion 64 by means of a bolt 68. A surface 70 of the secondary valve 66 is adapted to seat on the seat 28. The other end of the valve unit 62 is flanged as at 71 and cooperates with an annular member 72 in retaining the central portion of a diaphragm 74 for movement into and away from the recess 42. The greater portion of the diaphragm 74 is retained or clamped between the block of the valve assembly 10 and a plate 76 and the latter, as well as a flange 82 of a casing 80, is held to the block by means of bolts such as the bolt 78. The cuplike casing 80 retains an evacuated bellows 82 surrounded by a coil spring 84. The latter is retained between two end plates 86 and 88. The plate 86 is held in position by one end of a threaded member 89 which is accessible for axial adjustment from the outside of the casing 80. The end plate 88 is retained by two coacting members 90 and 92 held together by means of threads 94. The member 92 extends from the element 72 to the end plate 88 so that the end plate 88 moves with the central portion of the diaphragm 74 and the valve unit 62. The member 90 is a means for evacuating the bellows and it is sealed at 91.

The flow is metered at port 50 in response to the pressure in the recess 42 and the small pocket 40 which in turn is the resultant of pressure at the evaporator outlet and existent in the fitting 23 as modified by the pressure in the compressor return flow chamber 20. The modification is as imposed through the restricted passage 44.

The primary purpose of the valve assembly 10 is to meter refrigerant at high pressure into the low pressure evaporator and maintain a relatively constant pressure at the evaporator outlet under normal and high refrigeration loads. This is done by regulating the flow through the port 50. The diaphragm 74 is responsive through the fixed passages 46 and 44 to the evaporator outlet pressure and the compressor return flow chamber 20 pressure or suction pressure respectively and in combination. The evaporator inlet pressure is substantially that within the chamber 30 and does not act on the diaphragm 74 or control the flow through the port 50 in any way. With evaporator 16 under heavy load, the secondary valve 66 is close to its seat 28, throttling the flow of refrigerant from the evaporator and maintaining refrigerant pressure in the latter sufficiently high to prevent icing. With evaporator 16 under heavy load, secondary valve 66 is open with the flow of refrigerant being throttled mainly at port 50. With valve 66 open, pressures in fitting 23 and cavity 20 tend to equalize with control pressure on diaphragm 74 approaching evaporator outlet pressure. At low ambients or low loads on the evaporator a desired minimum evaporator pressure is maintained by the flow of refrigerant through a substantially wide open port 50, supplemented by the throttling of the evaporator outlet at 28. An adequate on return to the compressor is assured by the valve assembly 10 allowing a maximum refrigerant flow through the evaporator. Adjustability of the secondary valve 66, which is in the form of a poppet valve, with relation to its seat 28 may be accurately done by means of the bolt 68 so that the desired minimum evaporator pressure is maintained under extremely low ambient temperatures when the valve mechanism is fully extended.

In the operation of the system a refrigerant vapor at high pressure and temperature is discharged from the compressor 12 by means of line 13 to the condenser 14 where that vapor is condensed. The resulting liquid then flows under high pressure from the condenser 14 and through the line 9 into the pocket 38 and then into the pocket 36. The flow is metered at the port 50 to satisfy the predetermined pressure requirement for the refrigerant in the evaporator 16. The primary purpose of the valve assembly 10 is to maintain the predetermined refrigerant pressure in the evaporator except for certain conditions. If it be assumed that the refrigeration system is being used on an automobile, the entire control of the refrigerant flow is related closely with the axial position of the valve unit 62.

The position of the valve unit 62 is determined by the pressure of refrigerant in the recess 42 as exercised on the diaphragm 74 and this pressure is balanced on the atmospheric side by a preset loading of the spring 84 adjusted by means of the screw 89. Slots such as the slot 75 cause the inside of the cup 80 to be at atmospheric pressure but their main purpose is for the insertion of pins to retain the spring and bellows assembly within the cup 80 if the retaining screws 78 are removed.

The effects or variations in ambient pressure on the diaphragm 74 is neutralized by opposing forces acting on the evacuated bellows 82. Since the effective pressure areas of the bellows 82 and diaphragm 74 are equal, the refrigerant vapor pressure in the recess 42 on the diaphragm 74 becomes controlling and it is equalized with the pressure in the pocket 40 by way of the restricted clearance passage at 56. This restricted passage serves as a damper and stabilizes the rate of movement of the valve unit 62, i.e., it prevents hunting.

The evaporator outlet pressure is sensed in the pocket 40 by the interconnection passage 46 and pocket 40 is also connected with the chamber 20 by the passage 44 as heretofore stated. The vapor pressure in chamber 30 for normal operation, that is, above 50° ambient temperature, is substantially that existing at the evaporator inlet or the line 15 as the secondary valve 66 is not in throttling position. However, at ambient temperatures below 50° F. to which the evaporator 16 is subjected, the control pressure of the refrigerant vapor in the pocket 40 will be reduced sufficiently as the port 50 is open to move the valve 66 of the unit 62 toward full throttling position with respect to the valve seat 28. With the valve 66 in throttling position, the pressure at the evaporator outlet or in line 17 is maintained at a minimum level that will prevent icing of the evaporator core exterior surfaces. With the valve 66 in a throttling position, the pressure in the return flow chamber 20 will be lower than in the fitting 23 due to the pressure drop at the valve seat 28. The resultant unbalance of pressure on the valve unit 62 tends to open the valve 66 with respect to its seat 28. The valve would normally respond to evaporator outlet pressure in fitting 23 as sensed by the diaphragm 74 through passages 46, 40 and 56. To effectively compensate for the unbalanced forces at valve 66, the passages 44 and 46 are selectively restricted to give the desired resultant pressure in cavity 40. The control pressure in the pocket 40 with the valve 66 in a throttling position will, therefore, be at an intermediate level between evaporator outlet pressure at line 17 (upstream of the valve 66) and the pressure in the return flow chamber 20 (downstream of the valve 66). Pressure in the pocket 40 will, therefore, be lower than in line 17 and the resultant force on the diaphragm 74 through the pocket 42 tends to close the valve 66 on its seat 28. The action of the opposing forces, therefore, provides the necessary and effective control of evaporator pressure and temperature not only at temperature at which refrigeration is ordinarily required or desired but also at extremely low ambient temperatures.

For low vehicle speed operation and with high evaporator loads, increased flooding of the evaporator 16 with resultant refrigerant pressures above the normal control setting is desirable for optimum performance. To maintain this flow of refrigerant, the extent of closure of land 64 at port 50 for the desired minimum flow of refrigerant is determined by preadjustment of the valve 66 by means of the bolt 68 to which it is rigidly attached, to give proper position of the valve unit 62 when the valve 66 is back seated against the wall 69 serving as a stop. The bolt 62 is readily accessible through the end of the fitting 23.

Valve sensitivity in action is improved by allowing the convolution or rolling flexed portion of diaphragm 74 to enlarge as the valve unit 62 moves against the pressure of the spring 84. The small continuous increase in effective diaphragm area helps to overcome the change in pressure from the rates of the spring 84 and the bellows 82.

The clearance at the passage 52 is merely sufficient to permit sliding of the land portion 64. The slight high pressure refrigerant leakage which may occur at 52 is conducted to the evaporator inlet, thus minimizing the passage of liquid into the compressor return flow chamber 20. Such passage, if not minimized, would result in a loss of compressor capacity or effectiveness.

We claim:

1. A refrigeration system including a compressor, a condenser, a control valve assembly and an evaporator connected in that order for refrigerant flow, a compressor return flow chamber in said control valve assembly, said evaporator having a refrigerant fluid discharge connected to the inlet of said compressor by way of said compressor return flow chamber, said control valve assembly including an expansion valve controlling refrigerant flow to the evaporator and a secondary valve controlling the flow of refrigerant through said chamber to the compressor, said expansion valve and secondary valve constituting a unit and being movable in one direction as a unit, and means for moving said unit in accordance with a pressure intermediate those upstream and downstream of said secondary valve.

2. A refrigeration system as set forth in claim 1, said unit with its two valves being slidable and having means attached thereto for actuating it in accordance with variations in ambient pressure whereby said evaporator is maintained above the freezing point of any moisture deposit on the core of said evaporator.

3. In a refrigeration system including an evaporator, and a compressor, a valve assembly including a body defining a recess, a refrigerant return chamber and a low pressure chamber, coaxial bores in said body and extending between said chambers and to said recess, a pressure actuated diaphragm closing said recess, an inlet in said body leading to said return chamber, a valve unit fixed to said diaphragm to be moved thereby, said valve unit including an expansion valve and a secondary valve and being slidable in said bores, said expansion valve controlling one of said bores making said one bore effective as a port leading to said low pressure chamber, an outlet from the latter connected to the inlet of said evaporator, said secondary valve controlling said body inlet, an outlet leading from said return chamber to said compressor, means including a spring and evacuated bellows exerting force upon said diaphragm and against pressure in said recess, and restrictive passages in said body leading from said body inlet and said return chamber to said recess whereby said diaphragm may be acted upon by a pressure existent in said recess intermediate the pressures existent in said body inlet upstream of said secondary valve and said return chamber downstream of said secondary valve.

4. In a refrigeration system including a compressor, condenser, evaporator and valve assembly to form a closed refrigerant circuit, said valve assembly being as set forth in claim 3, and said expansion valve being small whereas said secondary valve is relatively large.

5. In a refrigeration system as set forth in claim 4, said valve unit being the sole variable control in the system for modifying operation of the latter to meet changing ambient conditions.

References Cited
UNITED STATES PATENTS

| | | | |
|---|---|---|---|
| 1,120,159 | 12/1914 | Pollard | 62—214 X |
| 2,116,801 | 5/1938 | Shivers | 62—217 |
| 3,119,559 | 1/1964 | Heidorn | 62—217 X |

MEYER PERLIN, *Primary Examiner.*